United States Patent [19]

Ruszala et al.

[11] 4,374,109

[45] Feb. 15, 1983

[54] MANUFACTURE OF PHOSPHOSIDERITE IRON PHOSPHATE

[75] Inventors: Ferdinand A. Ruszala; James T. Hoggins, both of Columbus; Stephen S. Hupp, Dublin, all of Ohio

[73] Assignee: Ashland Oil, Inc., Ashland, Ky.

[21] Appl. No.: 331,945

[22] Filed: Dec. 17, 1981

[51] Int. Cl.$^3$ .................... C01B 15/16; C01B 25/26
[52] U.S. Cl. .................................. 423/311; 423/305; 23/301; 23/305 F
[58] Field of Search ............... 423/304, 305, 306, 307, 423/311; 23/301 R, 305 F

[56] References Cited

U.S. PATENT DOCUMENTS 3,407,034 10/1968 Bennetch ........................... 423/311

FOREIGN PATENT DOCUMENTS 656921 1/1963 Canada ................................. 423/311
621067 1/1927 France ................................. 423/305

OTHER PUBLICATIONS

Cate et al., "Preparation of Crystalline Ferric Phosphates", Soil Science, vol. 88, No. 3, 1959, pp. 130–132.
Infra-Red, X Ray and Thermal Analysis of some Al and Fe Phosphates, Arlidge et al., J. Appl. Chem. 13, Jan. 1963, pp. 17–27.

*Primary Examiner*—O. R. Vertiz
*Assistant Examiner*—Gregory A. Heller
*Attorney, Agent, or Firm*—John F. Jones

[57] ABSTRACT

Phosphosiderite, $FePO_4.2H_2O$, is prepared in high yield from molten $Fe(NO_3)_3.9H_2O$ and $H_3PO_4$ using a phosphosiderite seed for initiation of precipitation and crystallization.

4 Claims, No Drawings

MANUFACTURE OF PHOSPHOSIDERITE IRON PHOSPHATE

CROSS REFERENCE TO RELATED APPLICATION

U.S. patent application Ser. No. 334,331, filed Dec. 24, 1981 discloses the use of phosphosiderite in the production of catalysts useful for oxydehydrogenation.

BACKGROUND OF THE INVENTION

1. Field of the Invention

This invention relates to a novel method for synthetic production of naturally occurring phosphosiderite in high yields and purity of product by seeding a molten mixture of $Fe(NO_3)_3.9H_2O$ and $H_3PO_4$ with phosphosiderite crystals so as to cause precipitation and crystallization of the phosphosiderite product.

2. Description of the Prior Art

Phosphosiderite is a naturally occurring form of iron phosphate ($FePO_4.2H_2O$) which has not previously been prepared in relatively pure form by conventional digesting and precipitation techniques (J. Appl. Chem., 13, January, 1963, pp. 17–27 and particularly page 19). Thus, previous techniques have used methods for synthesizing phosphosiderite in low yields often with evolution of water from acidic aqueous systems which are expensive and also produce acid fumes. Phosphosiderite can be produced by reaction of ferric chloride and sodium phosphate but it is difficult if not impossible to produce a product free of sodium chloride by this method.

SUMMARY OF THE INVENTION

The production of phosphosiderite in high yield according to this invention involves the seeding of a melt of $Fe(NO_3)_3.9H_2O+H_3PO_4$ (concentrated) with seeds of either natural or previously produced phosphosiderite ($FePO_4.2H_2O$) so as to cause the precipitation and crystallization of the phosphosiderite product. The process of this invention can be further illustrated as follows:

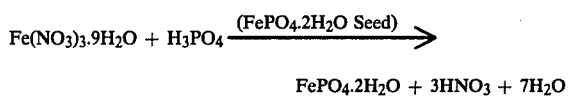

$$FePO_4.2H_2O + 3HNO_3 + 7H_2O$$

The temperature may be maintained at a temperature in the range of from 75° to 200° C.

DESCRIPTION OF THE PREFERRED EMBODIMENT

In the process of this invention ferric nitrate nonahydrate [$Fe(NO_3)_3.9H_2O$] is heated so that it melts in its own water of hydration and concentrated phosphoric acid [$H_3PO_4$] is added to the melt with stirring in such a fashion that the molar ratio of Fe:P is about 1. The resulting mixture is then seeded with fresh phosphosiderite [$FePO_4.2H_2O$] and the mixture turns cloudy with the concurrent formation of a mass of $FePO_4.2H_2O$ within about four hours of the seeding. The mixture is maintained at from about 95°–110° C. with stirring during this whole operation. Finally, the precipitated $FePO_4.2H_2O$ (phosphosiderite) is separated by filtration, centrifugation, etc. and washed with water prior to drying at about 120° C. for about 12 hours.

The process of this invention is further illustrated in the following example.

EXAMPLE

A mass of 606 g. of $Fe(NO_3)_3.9H_2O$ was heated with stirring at 95°–110° C. until it was liquified at which point 102 ml. of concentrated $H_3PO_4$ was added to the stirred and heated mass. The resulting stirred and heated melt was then treated with 300 mg. of a pure phosphosiderite ($FePO_4.2H_2O$) seeding material. The resulting melt became cloudy and with continued stirring and heating a voluminous mass of $FePO_4.2H_2O$ was precipitated from the melt within about four hours. The $FePO_4.2H_2O$ (phosphosiderite) was isolated by filtration, was washed with water and was dried at 120° C. for 12 hours. The crystal structure of the phosphosiderite product (about 80%) was identified by X-ray diffraction analysis.

We claim:

1. A method for preparing phosphosiderite ($FePO_4.2H_2O$) comprising treating a Malten mixture of $Fe(NO_3)_3.9H_2O$ and $H_3PO_4$ with a phosphosiderite seed material at a temperature in the range of from 75° to 200° C. for a period of time thus causing the precipitation of phosphosiderite product and recovering the product.

2. The method of claim 1 wherein the molar ratio of Fe:P in the mixture is about 1:1.

3. The method of claim 2 wherein the period of time is in the order of 4 hours.

4. The method of claim 3 wherein the product is recovered by filtration, washing with water and drying.

* * * * *

UNITED STATES PATENT AND TRADEMARK OFFICE
CERTIFICATE OF CORRECTION

PATENT NO. : 4,374,109

DATED : February 15, 1983

INVENTOR(S) : Ruszala et al.

It is certified that error appears in the above-identified patent and that said Letters Patent is hereby corrected as shown below:

Column 2, line 38, "Malten" should be "molten".

Signed and Sealed this

Nineteenth Day of April 1983

[SEAL]

Attest:

GERALD J. MOSSINGHOFF

Attesting Officer

Commissioner of Patents and Trademarks